Dec. 26, 1950        A. A. BERESTNEFF        2,535,776
ABSORPTION REFRIGERATION SYSTEM
Original Filed July 13, 1946        2 Sheets-Sheet 2
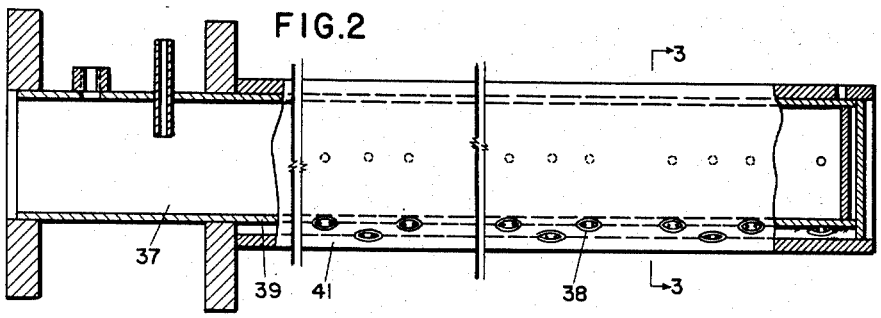
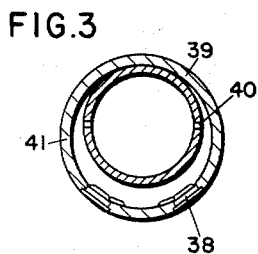
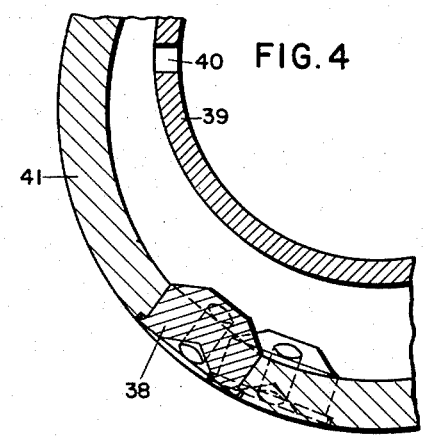
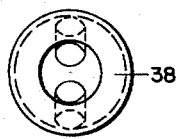
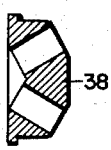
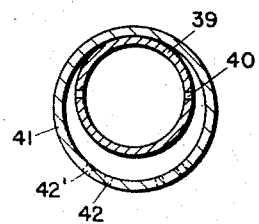
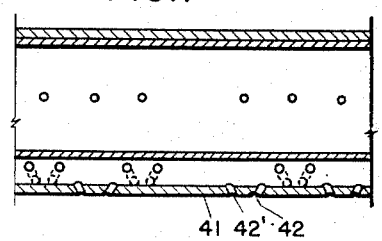
INVENTOR.
Alexis A. Berestneff
BY
ATTORNEY Patented Dec. 26, 1950

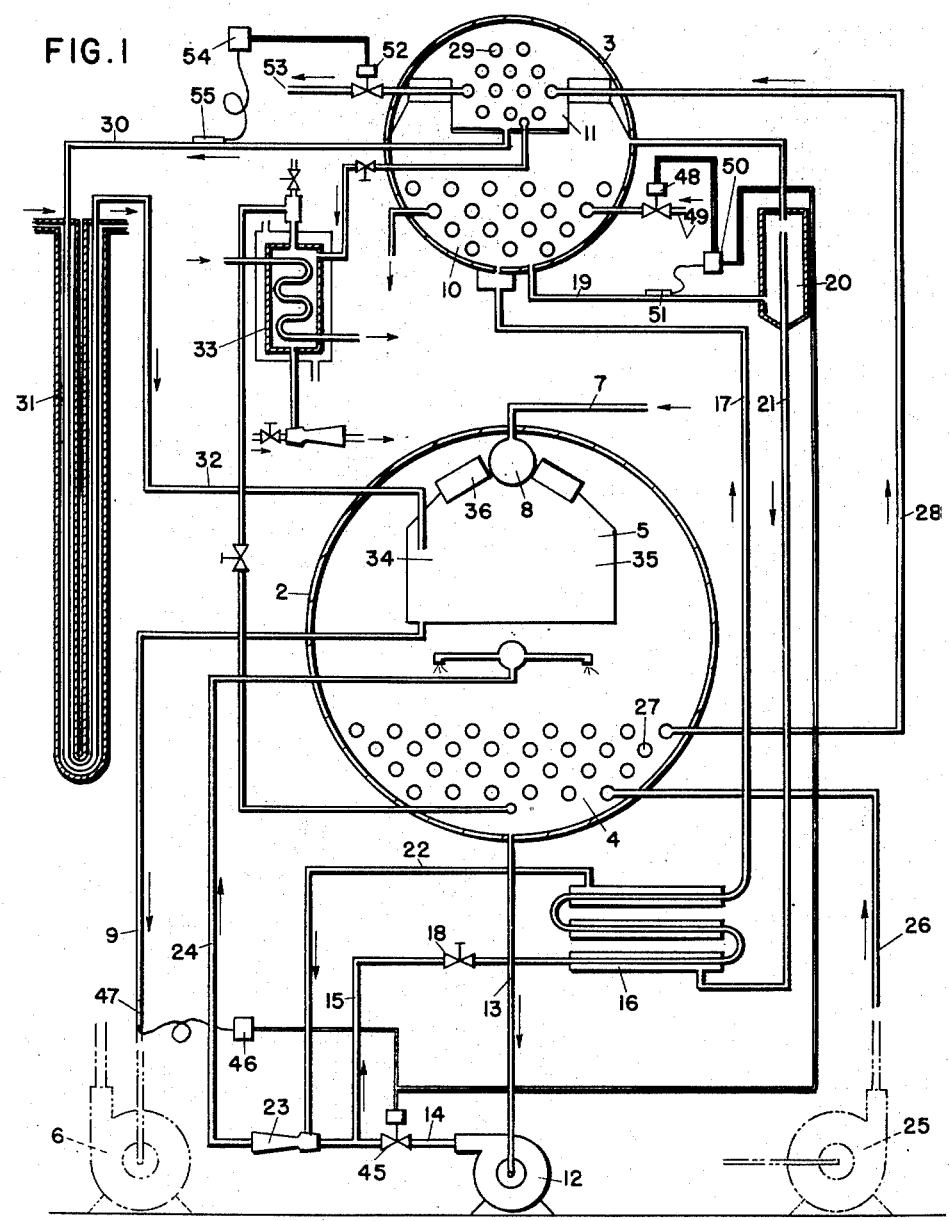

2,535,776

UNITED STATES PATENT OFFICE 2,535,776

ABSORPTION REFRIGERATION SYSTEM

Alexis A. Berestneff, Syracuse, N. Y., assignor to Carrier Corporation, Syracuse, N. Y., a corporation of Delaware Original application July 13, 1946, Serial No. 683,387. Divided and this application May 27, 1948, Serial No. 29,526

3 Claims. (Cl. 62—5)

This application is a division of my co-pending application, Serial No. 683,387, filed July 13, 1946, entitled Absorption Refrigeration Systems, and relates to an absorption refrigeration system including an improved evaporator spray arrangement.

The chief object of the present invention is to provide an absorption refrigeration system including a novel and improved spray arrangement for distributing refrigerant in the evaporator.

An object of my invention is to provide an absorption refrigeration machine including a spray arrangement for spraying water in the evaporator so designed as to assure uniform distribution of spray in the evaporator without interference with flashed vapor arising from the evaporator.

A further object is to provide an absorption refrigeration system including a spray arrangement of simple and economical design which distributes spray uniformly in the evaporator without interference with flashed vapor. Other objects of my invention will be readily perceived from the following description.

This invention relates to an absorption refrigeration system comprising, in combination, a horizontally extending shell, an absorber arrangement disposed in the shell and extending longitudinally thereof, an evaporator arrangement in said shell above the absorber arrangement, a second horizontally extending shell placed above said first shell, a generator arrangement disposed in said shell and extending longitudinally thereof, a condenser disposed in said second shell above the generator arrangement, means for withdrawing solution from the generator and for forwarding solution to the absorber and means for circulating solution from the absorber to the generator. Refrigerant is forwarded to the evaporator, the refrigerant being flash cooled in the evaporator; the flashed vapor passes downward about the evaporator to the absorber to be absorbed by solution therein. In the generator substantially the same amount of vapor is boiled out, passed to the condenser, is condensed and returned to the chilled water circuit. The rarefied vapor in the absorber evaporator shell serves to insulate the evaporator from the ambient atmosphere. Control arrangements are provided for maintaining the capacity of and the concentration of solution in the system as well as pressure, temperature of cooling water and the flow of solution and of condensing water. An improved spray arrangement is provided to permit refrigerant to be uniformly distributed throughout the evaporator without interference with flashed vapor arising from the evaporator. A heat exchanger, preferably, is provided to place the strong and weak solutions in heat exchange relation with one another thereby decreasing the cost of operation of the system.

The attached drawings illustrate a preferred embodiment of my invention in which Figure 1 is a diagrammatic view illustrating the flow of solution through the various elements of the refrigeration system;

Figure 2 is a view partly in section and partly in elevation illustrating the spray arrangement for supplying refrigerant to the evaporator;

Figure 3 is a sectional view taken on the line 3—3 of Figure 2;

Figure 4 is a fragmentary sectional view drawn to enlarged scale to illustrate the position of the nozzles in the spray arrangement of Figure 2;

Figure 5 is a sectional view of the nozzle shown in Figure 4;

Figure 6 is a plan view of the nozzle shown in Figures 4 and 5;

Figure 7 is a sectional view of a modified spray arrangement; and

Figure 8 is a sectional view taken on the line 8—8 of Figure 7.

Referring to the drawings, there are shown horizontally extending drums or shells 2 and 3, shell 3 preferably being secured in place above shell 2; shell 2 encloses a longitudinally extending absorber arrangement 4 and a longitudinally extending evaporator arrangement 5 disposed above the absorber 4. Chilled water treated by the system is circulated by a pump 6 through an air conditioning device of any desired type (not shown) and is returned from the air conditioning device to the evaporator 5 through line 7. The chilled water is sprayed in evaporator 5 by a suitable spray arrangement 8, the chilled water being flash cooled in the evaporator and being drawn from the evaporator through line 9 by pump 6 and again forwarded to the air conditioning device.

Shell 3 encloses a longitudinally extending generator arrangement 10 and a longitudinally extending condenser arrangement 11 disposed above the generator 10. Weak solution is withdrawn from absorber 4 by pump 12 through line 13 and is forwarded to the generator 10 through lines 14, 15, heat exchanger 16 and line 17. A restriction 18 may be disposed in line 15. Strong solution is withdrawn from generator 10 through line 19, overflow arrangement 20, line 21, heat exchanger 16 and line 22, to an ejector 23 which forwards strong solution through line 24 to absorber 4. Line 22 is looped to maintain an adequate quantity of strong solution in heat exchanger 16 for heat exchange purposes. The strong and weak solution lines are disposed in heat exchange relation by means of heat exchanger 16. Solution overflow arrangement 20 serves to prevent solution in generator 10 rising above or sinking below a predetermined level.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the present system. I have found that a solution consisting of lithium bromide and water is highly satisfactory for use. Other salt solutions may be used if desired in this system; when this system is operated at high temperatures (above freezing temperature) a solution of lithium chloride and water or a solution of sodium hydroxide and water, for example, may be used. It will be understood when the present invention is used to attain low temperatures ammonia, for example, may be used as a refrigerant.

A pump 25 passes cooling water through line 26 to the coil 27 of absorber 4 and then forwards the water after its passage through absorber 4, through line 28 to the coil 29 of condenser 11. After passage through the coil of condenser 11, the water is discharged or, if desired, may be re-used as in the case of a cooling tower.

A line 30 is adapted to withdraw vapor condensate from condenser 11, the vapor condensate passing through a pre-cooler assembly 31 and then being returned through line 32 to the evaporator 5. The condensate pre-cooler 31 may consist of a double pipe assembly in which a cooling medium is passed in heat exchange relation with the vapor condensate. Pre-cooler 31 is shaped in the form of a loop to maintain a secure liquid seal between shells 2 and 3 thus permitting different pressures to be maintained in such shells without escape of vapor.

A suitable purge arrangement 33 is provided to purge condenser 11 and absorber 4 of air or other non-condensible gases. Purge 33 may operate intermittently or continuously as desired.

Evaporator 5 consists of horizontally extending side walls 34 and end walls (not shown) which serve to form a box-like compartment 35, supported to the end walls (not shown) of shell 2. Eliminators 36 are disposed adjacent the top of compartment 35 and extend longitudinally thereof. The eliminators 36 serve to prevent any drops of water entrained by the flashed vapor from being carried over to absorber 4 and return them to compartment 35.

Spray arrangement 8 is disposed between the eliminators 36 and receives refrigerant (chilled water or the like) returning from the air conditioning device and discharges it in compartment 35. Spray arrangement 8 as shown in Figure 2 consists of a header 37 which extends longitudinally of compartment 35; preferably header 37 is provided with a plurality of fan-shaped spray nozzles 38 disposed on opposite sides of header 37. Nozzles 38 are disposed in a position such that the sprays are placed in a vertical plane. This particular arrangement provides an adequate surface of water for evaporation and does not interfere with the vapor flowing upward. The result of the spray arrangement is a reduced entrainment of liquid drops or particles by the vapor.

Header 37 preferably includes an inner pipe 39 (refer to Figure 4) having openings 40 therein, disposed in a second or outer pipe 41 which carries nozzles 38. Nozzles 38 are arranged on opposite sides of and adjacent the bottom of pipe 41; the openings 40 in pipe 39 may be disposed at the sides thereof. This arrangement permits a reduction in approach velocity of the water or other refrigerant entering header 37 and assures adequate and equal distribution thereof among all the nozzles 38.

If desired, nozzles 38 may be disposed at an angle to permit the sprays therefrom to meet the wall 34 of compartment 35. If desired, the nozzles may be adjusted in such manner that the sprays are absorbed by water at the bottom of compartment 35. In either case, the arrangement reduces the amount of liquid entrained and permits flash cooling without interference with the flashed vapor.

In Figures 7 and 8, I have disclosed a modified form of spray arrangement in which the fan-shaped spray nozzles are eliminated. In place thereof, a plurality of pairs of openings 42 and 42' are formed in pipe 41; the openings of each pair are disposed at an acute angle from a perpendicular line drawn therebetween and extend toward one another. The spray arrangement so provided reduces the amount of liquid entrained and permits flash cooling without interference with the flashed vapor.

It is desirable that the capacity be changed immediately upon change in load to attain most satisfactory operation. The temperature of the chilled water may be used to indicate a change in load since a decrease in the temperature thereof from a pre-determined point indicates that the load imposed upon this system has decreased. As the temperature of the chilled water leaving the evaporator decreases the capacity of the system may be decreased accordingly by throttling the volume of strong solution passing to the absorber.

For this purpose a valve 45 is placed in line 14 between ejector 23 and pump 12. Valve 45 is actuated by a thermostat control 46 operated by a bulb 47 placed in or adjacent to line 9. As the temperature of chilled water passing through line 9 decreases, fluid in bulb 47 contracts; the control 46 in accordance therewith tends to move valve 45 towards a closed position, thereby decreasing the amount of weak solution being forwarded to generator 10 through lines 15 and 17, proportionately to the decrease in the temperature of the chilled water. Movement of valve 45 toward a closed position also decreases proportionately the amount of weak solution passing to ejector 23. The reduction in the amount of weak solution passing to ejector 23 reduces the velocity of such solution through the nozzle of the ejector and consequently a smaller quantity of strong solution is entrained or induced from line 22. The throttling action of valve 45 reduces the amount of solution passing to and returning from generator 10 and likewise reduces the amount of solution passing to ejector 23 and forwarded to absorber 4.

A valve 48 is provided in steam line 49 to control the amount of steam passing into the tubes of generator 10 in accordance with the load imposed upon the system. Valve 48 is actuated by thermostat control 50, operated in turn by a bulb 51, disposed in or adjacent to line 19. The amount of condensing water passing through condenser 11 is controlled by means of a valve 52 placed in line 53, actuated by a thermostat control 54 controlled by bulb 55, disposed in or adjacent to vapor condensate line 30.

The present invention provides an absorption refrigeration system including a spraying arrangement for spraying water in the evaporator so designed as to assure uniform distribution of water throughout the evaporator and a uniform distribution of spray in the evaporator without interference with flashed vapor arising from the evaporator. The spraying arrangement is economical in cost and may be readily installed in the system.

While I have described a preferred embodiment of my invention it will be understood my invention is not limited thereto since it may be otherwise embodied within the scope of the following claims.

I claim:

1. A spray arrangement which comprises a cylindrical member adapted to receive a fluid, a second cylindrical member surrounding said first member, the longitudinal axis of the first member being disposed in a plane above the plane of the longitudinal axis of the second member to provide space for the accumulation of fluid in said second member, said first member having a plurality of openings therein connecting the interior thereof with the interior of said second member, said second member having a plurality of nozzles connected with said second member adapted to discharge fluid in a series of substantially uniform sheet-like sprays, the openings in said first member being disposed a sufficient distance above the nozzles of said second member to permit fluid to accumulate in the base of said second member adjacent the nozzles thereby reducing the turbulence of fluid flow in the second member and its velocity of discharge from said nozzles.

2. A spray arrangement which comprises a member adapted to receive refrigerant, a second member surrounding said first member, the longitudinal axis of the first member being disposed in a plane above the plane of the longitudinal axis of the second member to provide space for the accumulation of refrigerant in said second member, said first member having a plurality of openings therein connecting the interior thereof with the interior of said second member, said second member having a plurality of spaced openings therein arranged in pairs to discharge refrigerant in a substantially uniform sheet-like spray, the openings of each pair extending through the wall of the member toward one another and at an acute angle from a perpendicular line drawn therebetween, the openings in said first member being disposed a sufficient distance above the openings in said second member to permit the refrigerant to accumulate in the base of said second member adjacent the openings therein thereby reducing the turbulence of refrigerant flow in the second member and its velocity of discharge from the openings therein.

3. A spray arrangement for distributing refrigerant in the evaporator of an absorption refrigeration system which comprises a cylindrical member having openings in the side thereof, a second cylindrical member inclosing the first cylindrical member, said first member having its longitudinal axis disposed in a plane above the plane of the longitudinal axis of the second member to provide space for the accumulation of refrigerant in the second member, nozzles disposed on opposite sides of and adjacent the bottom of the second member to discharge refrigerant in a series of substantially uniform sheet-like sprays, the openings in said first member being disposed a sufficient distance above the nozzles of the second member to permit refrigerant to accumulate in the base of the second member adjacent the nozzles thereby reducing the turbulence of refrigerant flow in the second member and its velocity of discharge from the nozzles.

ALEXIS A. BERESTNEFF.

REFERENCES CITED

The following references are of record in the file of this patent:

UNITED STATES PATENTS

| Number | Name | Date |
| --- | --- | --- |
| 1,078,636 | Naylor | Nov. 18, 1913 |
| 1,084,359 | Potter | Jan. 13, 1914 |
| 1,173,279 | Kinney | Feb. 29, 1916 |
| 2,213,955 | De Freitas | Sept. 10, 1940 |
| 2,272,856 | Thomas | Feb. 10, 1942 |
| 2,298,924 | Bichowsky | Oct. 13, 1942 |
| 2,372,309 | Bichowsky | Mar. 27, 1945 |
| 2,408,480 | Reid | Oct. 1, 1946 |